(12) United States Patent
Meng

(10) Patent No.: US 10,165,595 B2
(45) Date of Patent: Dec. 25, 2018

(54) DEVICE AND METHOD OF HANDLING UPLINK TRANSMISSION

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 85 days.

(21) Appl. No.: 15/423,599

(22) Filed: Feb. 3, 2017

(65) Prior Publication Data
US 2017/0230998 A1 Aug. 10, 2017

Related U.S. Application Data

(60) Provisional application No. 62/291,898, filed on Feb. 5, 2016.

(51) Int. Cl.
*H04W 72/14* (2009.01)
*H04L 1/00* (2006.01)
*H04L 1/18* (2006.01)

(52) U.S. Cl.
CPC ........... *H04W 72/14* (2013.01); *H04L 1/0025* (2013.01); *H04L 1/0056* (2013.01);
(Continued)

(58) Field of Classification Search
CPC ........ H04W 72/14; H04L 1/08; H04L 1/0056; H04L 1/1812; H04L 1/1858; H04L 1/189
See application file for complete search history.

(56) References Cited

U.S. PATENT DOCUMENTS

2012/0257559 A1 10/2012 Kim
2013/0242824 A1* 9/2013 Lee .................. H04L 1/1819
370/281
(Continued)

FOREIGN PATENT DOCUMENTS

WO 2015142066 A1 9/2015

OTHER PUBLICATIONS

Search Report dated Jun. 9, 2017 for EP application No. 17154400.0, pp. 1-14.
(Continued)

*Primary Examiner* — Pao Sinkantarakorn
*Assistant Examiner* — Kabir U Jahangir
(74) *Attorney, Agent, or Firm* — Winston Hsu

(57) ABSTRACT

A network of handling uplink (UL) transmission comprises instructions of configuring a maximum retransmission attempt to a communication device; configuring a UL transmission skipping mechanism to the communication device; transmitting a UL grant comprising a first modulation and coding scheme (MCS) and an allocation of a first resource to the communication device for performing the UL transmission; receiving the UL transmission generated according to the first MCS in the first resource according to the UL transmission skipping mechanism; decoding the UL transmission for a plurality of times according to an error control coding (ECC) scheme, wherein the UL transmission is a first redundant version (RV) corresponding to a new transmission with a first RV index or a second RV corresponding to a retransmission with a second RV index; and transmitting an acknowledgment indicating whether the UL transmission is decoded successfully to the communication device.

19 Claims, 5 Drawing Sheets

(52) U.S. Cl.
CPC .......... *H04L 1/1812* (2013.01); *H04L 1/1819* (2013.01); *H04L 1/1854* (2013.01); *H04L 1/1864* (2013.01); *H04L 1/1896* (2013.01)

(56) References Cited

U.S. PATENT DOCUMENTS

2013/0250924 A1  9/2013  Chen
2014/0313997 A1  10/2014 Xu
2016/0381666 A1  12/2016 Kim

OTHER PUBLICATIONS

3GPP TSG RAN Meeting #67 RP-150465, Mar. 2015.
3GPP TS 36.212 V12.5.0 (Jun. 2015).
3GPP TS 36.213 V12.5.0 (Mar. 2015).

* cited by examiner

DEVICE AND METHOD OF HANDLING UPLINK TRANSMISSION

CROSS REFERENCE TO RELATED APPLICATIONS

This application claims the benefit of U.S. Provisional Application No. 62/291,898, filed on Feb. 5, 2016, which is incorporated herein by reference.

BACKGROUND OF THE INVENTION

1. Field of the Invention

The present invention relates to a communication device and a method used in a wireless communication system, and more particularly, to a communication device and method of handling uplink transmission in a wireless communication system.

2. Description of the Prior Art

A user equipment (UE) has to transmit a scheduling request to a network for requesting uplink (UL) resource(s) and the network has to transmit a UL grant to the UE for assigning the UL resource(s), before the UE performs UL transmission. A latency of the UL transmission can be expected, because a plurality of operation need to be performed before the UL transmission being performed. The latency can be reduced by that the network transmits the UL grant to the UE periodically, such that the UE can perform the UL transmission via the UL resource (s) assigned in the UL grant whenever necessary.

According to the prior art, the UE has to perform the UL transmission once the UE receives the UL grant, even if the UE does not have UL data for transmission. Thus, a UL transmission skipping mechanism, which allows the UE skipping the UL transmission if the UE does not have the UL data for transmission, is proposed for improving power consumption of the UE. However, the network cannot distinguish a failed UL transmission from a skipped UL transmission, when the UL transmission skipping mechanism is operated by the UE. Thus, the network cannot decode the UL transmission properly. As a result, throughput of decoding and the benefit of the power saving of the UL transmission skipping mechanism are degraded.

Thus, how to handle the UL transmission performed with the UL transmission skipping mechanism is an important problem to be solved.

SUMMARY OF THE INVENTION

The present invention therefore provides a method and related communication device for handling uplink transmission to solve the abovementioned problem.

A network of handling uplink (UL) transmission comprises a storage unit for storing instructions and a processing circuit coupled to the storage unit. The processing circuit is configured to execute the instructions stored in the storage unit. The instructions comprise configuring a maximum retransmission attempt to a communication device; configuring a UL transmission skipping mechanism to the communication device; transmitting a UL grant comprising a first modulation and coding scheme (MCS) and an allocation of a first resource to the communication device for performing the UL transmission; receiving the UL transmission generated according to the first MCS in the first resource according to the UL transmission skipping mechanism; decoding the UL transmission for a plurality of times according to an error control coding (ECC) scheme, wherein the UL transmission is a first redundant version (RV) corresponding to a new transmission with a first RV index or a second RV corresponding to a retransmission with a second RV index; and transmitting an acknowledgment indicating whether the UL transmission is decoded successfully to the communication device.

A communication device of handling uplink (UL) transmission comprises a storage unit for storing instructions and a processing circuit coupled to the storage unit. The processing circuit is configured to execute the instructions stored in the storage unit. The instructions comprise receiving a first configuration configuring a maximum retransmission attempt from a network; receiving a second configuration configuring a UL transmission skipping mechanism from the network; receiving a first UL grant comprising a first modulation and coding scheme (MCS) and an allocation of a first resource from the network; encoding a transport block according to an error control coding (ECC) scheme; transmitting a first redundant version (RV) of the transport block according to a plurality of RV indices, the first MCS, the allocation of the first resource and the UL transmission skipping mechanism to the network; transmitting a first new data indicator (NDI) indicating that the first RV is a new transmission to the network; receiving a first acknowledgment indicating whether the first RV is decoded successfully from the network; receiving a second UL grant comprising a second MCS and an allocation of a second resource from the network; transmitting a second RV of the transport block according to the plurality of RV indices, the second MCS, the allocation of second resource and the UL transmission skipping mechanism to the network; transmitting a second NDI indicating that the second RV is a retransmission to the network, if the maximum retransmission attempt is larger than 0 and the first acknowledgment comprises an "NACK"; and repeating the last four instructions, until a second acknowledgment comprising an "ACK" is received from the network or the maximum retransmission attempt is achieved.

A network of handling uplink (UL) transmission comprises a storage unit for storing instructions and a processing circuit coupled to the storage unit. The processing circuit is configured to execute the instructions stored in the storage unit. The instructions comprise configuring a maximum retransmission attempt to a communication device; configuring a UL transmission skipping mechanism to the communication device; transmitting a UL grant comprising a first modulation and coding scheme (MCS) and an allocation of a first resource to the communication device for performing the UL transmission; receiving the UL transmission generated according to the first MCS in the first resource according to the UL transmission skipping mechanism; receiving a new data indicator (NDI) indicating that the UL transmission is a new transmission or a retransmission; decoding the UL transmission as a first redundant version (RV) corresponding to the new transmission with a first RV index according to an error control coding (ECC) scheme, if the NDI indicating that the UL transmission is the new transmission; or decoding the UL transmission as a second RV corresponding to the mth retransmission with a second RV index according to the ECC scheme, if the NDI indicating that the UL transmission is the retransmission; and transmitting an acknowledgment indicating whether the UL transmission is decoded successfully to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
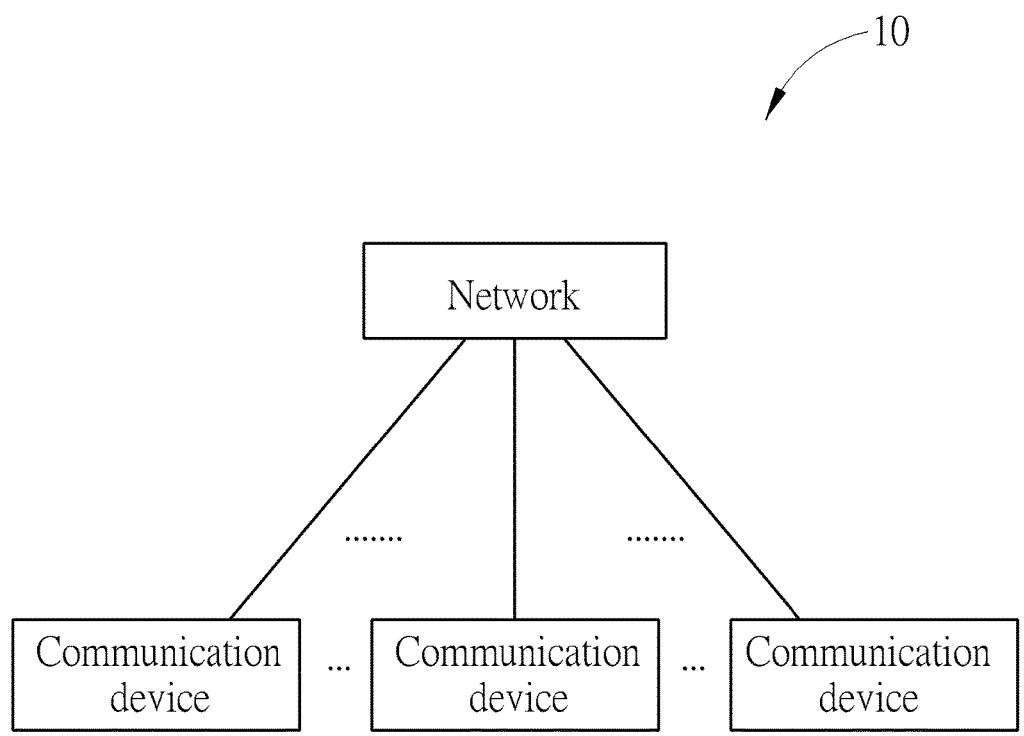
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved Node-B (eNB) in an evolved universal terrestrial radio access network (UTRAN) (E-UTRAN) of a long term evolution (LTE) system, or a fifth generation (5G) BS employing orthogonal frequency-division multiplexing (OFDM) and/or non-OFDM for communicating with the communication devices (e.g., transmitting/receiving a physical downlink (DL) control channel (PDCCH) and/or an enhanced PDCCH (EPDCCH), and encoding/decoding DL/uplink (UL) data according to an error control coding (ECC) scheme) in a system bandwidth (e.g., 20 MHz) and/or a transmission time interval (TTI) (e.g., 1 ms).

The communication device may be a user equipment (UE), a mobile phone, a laptop, a tablet computer, an electronic book, a portable computer system, a vehicle or an aircraft. In addition, the network and the communication device can be seen as a transmitter or a receiver according to transmission direction, e.g., for a UL, the communication device is the transmitter and the network is the receiver, and for a DL, the network is the transmitter and the communication device is the receiver.

Figure 2:
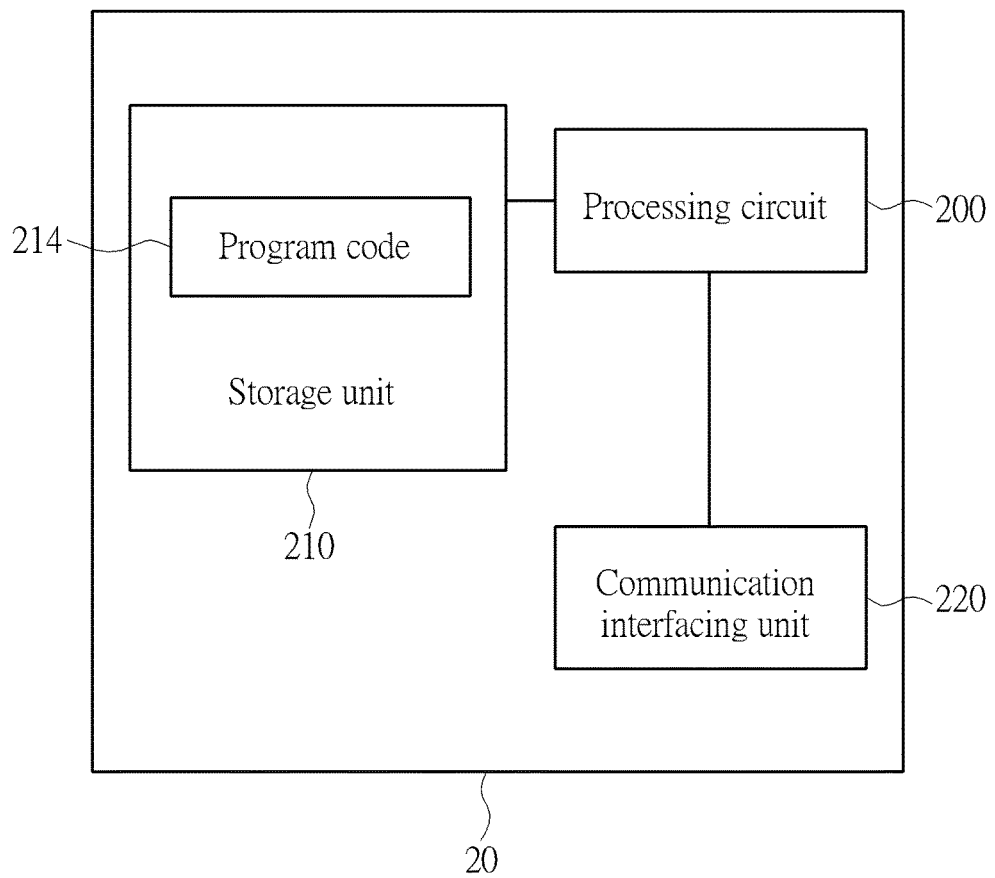
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent the communication device in FIG. 1, to simplify the illustration of the embodiments.

Figure 3:
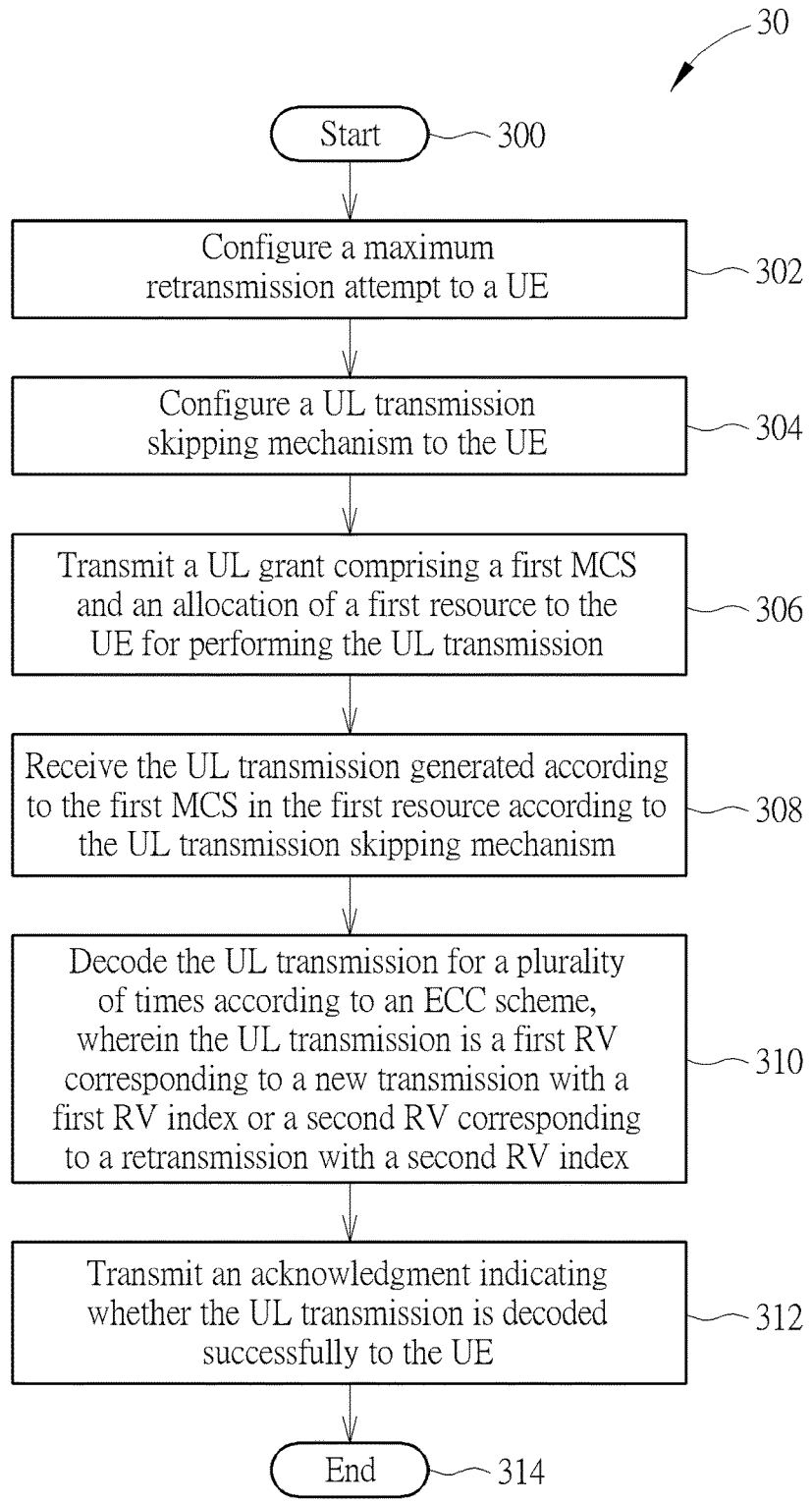
FIG. 3 is a flowchart of a process according to an example of the present invention.

FIG. 3 is a flowchart of a process 30 according to an example of the present invention. The process 30 may be utilized in a network, to handle UL transmission in a wireless communication system. The process 30 includes the following steps:

Step 300: Start.

Step 302: Configure a maximum retransmission attempt to a UE.

Step 304: Configure a UL transmission skipping mechanism to the UE.

Step 306: Transmit a UL grant comprising a first modulation and coding scheme (MCS) and an allocation of a first resource to the UE for performing the UL transmission.

Step 308: Receive the UL transmission generated according to the first MCS in the first resource according to the UL transmission skipping mechanism.

Step 310: Decode the UL transmission for a plurality of times according to an ECC scheme, wherein the UL transmission is a first redundant version (RV) corresponding to a new transmission with a first RV index or a second RV corresponding to a retransmission with a second RV index.

Step 312: Transmit an acknowledgment indicating whether the UL transmission is decoded successfully to the UE.

Step 314: End.

According to the process 30, the network may configure a maximum retransmission attempt and a UL transmission skipping mechanism to the UE. Then, the network may transmit a UL grant including a first MCS and an allocation of a first resource (e.g., resource block (RB)) to the UE for performing the UL transmission (e.g., hybrid automatic repeat request (HARQ) transmission). Further, the network may receive the UL transmission generated according to the first MCS in the first resource according to the UL transmission skipping mechanism. The network may decode the UL transmission for a plurality of times according to (e.g., by using) an ECC scheme, wherein the UL transmission may be a first RV corresponding to a new transmission with a first RV index (e.g., of a transport block) or a second RV corresponding to a retransmission with a second RV index (e.g., of the transport block). Accordingly, the network may transmit an acknowledgment (e.g., "ACK" or "NACK") indicating whether the UL transmission is decoded successfully to the UE. That is, the network decodes the UL transmission according to (e.g., by using) a blind decoding scheme. Thus, the network can decode the UL transmission properly no matter whether the UL transmission is the new transmission or the retransmission. As a result, throughput of decoding is improved and the benefit of the power saving of the UL transmission skipping mechanism is preserved.

Realization of the process 30 is not limited to the above description. The following examples may be applied for realizing the process 30.

In on example, the maximum retransmission attempt, N, may be a positive integer. In on example, the plurality of times, K, may be a positive integer smaller than (or equal to) (N+1). For example, the network may decode the UL transmission at most 3 times, if N is assumed as 2. In on example, the retransmission may be the nth retransmission, wherein n is a positive integer smaller than (or equal to) N. In on example, the network may jointly decode (e.g., by using soft combining) the retransmission with n previously received UL transmission (i.e., the new transmission, the first retransmission, . . . , the n−1 retransmission), if the retransmission is the nth retransmission.

In on example, the network may transmit a preconfigured semi-persistent scheduling (SPS) configuration in a second resource (e.g., time/frequency resource) to the UE according to (e.g., by using) a second MCS. The SPS configuration may be used for configuring (e.g., granting) indefinite opportunities (e.g., time/frequency resources) to the UE periodically (e.g., in a periodic fashion) to perform the UL transmission.

In on example, the ECC scheme may include at least one of a turbo coding scheme and a tail-biting convolutional coding (TBCC) scheme. In one example, the ECC scheme may include at least one of a low density parity check (LDPC) code scheme and a polar code scheme, and is not limited herein. In on example, the ECC scheme may be predetermined and specified (e.g., newly defined) in the 3GPP standard, e.g., explicitly. In on example, the ECC scheme may be already known by the network and the UE, e.g., implicitly. In one example, the ECC scheme may be configured (e.g., higher layer signaled) by the network, e.g., explicitly.

In on example, the first RV index and the second RV index may be predetermined and specified (e.g., newly defined) in the 3GPP standard, e.g., explicitly. In on example, the first RV index and the second RV index may be already known by the network and the UE, e.g., implicitly. In on example, the first RV index and the second RV index may be determined according to at least one of a subframe index of a subframe used in the UL transmission and a cell radio network temporary identifier (C-RNTI) of the UE, e.g., implicitly. In on example, the network may receive the first RV index and the second RV index determined by the UE (e.g., autonomously) from the UE.

In one example, the first RV index may be transmitted according to (e.g., by using) a third MCS and a third allocation of a third resource, and the second RV index may be transmitted according to (e.g., by using) a fourth MCS and a fourth allocation of a fourth resource. In other words, the first RV index and the second RV index may be encoded, modulated and mapped to different resources (e.g., time/frequency resource) separately. Accordingly, the first RV index and the second RV index may be received in the UL transmission separately. In one example, the third MCS and the third allocation of the third resource, and the fourth MCS and the fourth allocation of the fourth resource may be predetermined and specified (e.g., newly defined) in the 3GPP standard, e.g., explicitly. In one example, the third MCS and the third allocation of the third resource, and the fourth MCS and the fourth allocation of the fourth resource may be already known by the network and the UE, e.g., implicitly. In one example, the third MCS and the third allocation of the third resource, and the fourth MCS and the fourth allocation of the fourth resource may be configured (e.g., assigned) by the network, e.g., explicitly.

In one example, the first RV index and/or the second RV index may be transmitted according to a puncturing scheme. That is, a plurality of parity bits of the transport block are overwritten for allocating the first RV index and/or the second RV index. In one example, the first RV index and/or the second RV index may be transmitted according to a rate matching scheme. That is, at least one resource unit (e.g., RB, near an UL reference signal (RS)) of the transport block which is not completely filled is used for allocating the first RV index and/or the second RV index. Examples of transmitting the first RV index and/or the second RV index are not limited herein.

In on example, the network may store the UL transmission in a soft buffer. In one example, the soft buffer may be used for storing a plurality of UL transmission. In one example, the network may store (e.g., overwrite) a newly received UL transmission by removing (e.g., clearing) an oldest (e.g., stored for the longest time) UL transmission in the soft buffer.

In on example, a HARQ process for the UL transmission may be disabled (e.g., not in use), if the maximum retransmission attempt is configured as 0. Thus, the network may not receive any retransmission from the UE. In on example, the UL transmission includes a plurality of OFDM-based signals. Accordingly, the UL transmission may be received as the OFDM-based signals.

Figure 4:
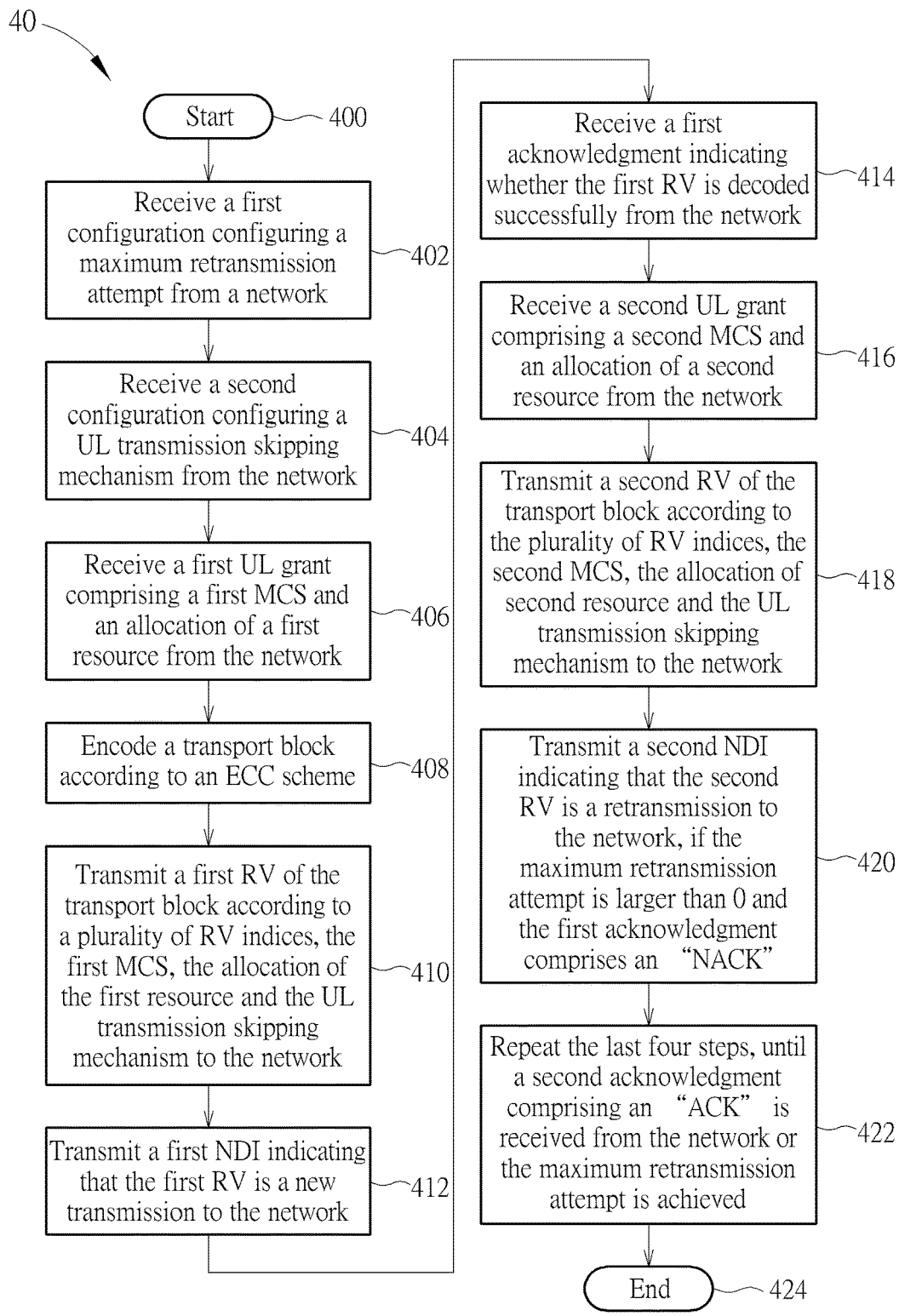
FIG. 4 is a flowchart of a process according to an example of the present invention.

FIG. 4 is a flowchart of a process 40 according to an example of the present invention. The process 40 may be utilized in a UE, to handle UL transmission in a wireless communication system. The process 40 includes the following steps:

Step 400: Start.

Step 402: Receive a first configuration configuring a maximum retransmission attempt from a network.

Step 404: Receive a second configuration configuring a UL transmission skipping mechanism from the network.

Step 406: Receive a first UL grant comprising a first MCS and an allocation of a first resource from the network.

Step 408: Encode a transport block according to an ECC scheme.

Step 410: Transmit a first RV of the transport block according to a plurality of RV indices, the first MCS, the allocation of the first resource and the UL transmission skipping mechanism to the network.

Step 412: Transmit a first NDI indicating that the first RV is a new transmission to the network.

Step 414: Receive a first acknowledgment indicating whether the first RV is decoded successfully from the network.

Step 416: Receive a second UL grant comprising a second MCS and an allocation of a second resource from the network.

Step 418: Transmit a second RV of the transport block according to the plurality of RV indices, the second MCS, the allocation of second resource and the UL transmission skipping mechanism to the network.

Step 420: Transmit a second NDI indicating that the second RV is a retransmission to the network, if the maximum retransmission attempt is larger than 0 and the first acknowledgment comprises an "NACK".

Step 422: Repeat the last four steps, until a second acknowledgment comprising an "ACK" is received from the network or the maximum retransmission attempt is achieved.

Step 424: End.

According to the process 40, the UE may receive a first configuration configuring a maximum retransmission attempt, a second configuration configuring a UL transmission skipping mechanism, and a first UL grant including a first MCS and an allocation of a first resource (e.g. RB) from the network. Then, the UE may encode a transport block (e.g., as a codeword) according to (e.g., by using) an ECC scheme. Further, The UE may transmit a first RV of the transport block according to a plurality of RV indices, the first MCS, the allocation of the first resource and the UL transmission skipping mechanism to the network. The UE may transmit a first NDI indicating that the first RV is a new transmission to the network. The UE may receive a first acknowledgment (e.g., "ACK" or "NACK") indicating whether the first RV is decoded successfully from the network. The UE may receive a second UL grant including a second MCS and an allocation of a second resource (e.g. RB) from the network. Further, the UE may transmit a second RV of the transport block according to the plurality of RV indices, the second MCS, the allocation of second resource and the UL transmission skipping mechanism to the network. The UE may transmit a second NDI indicating that the second RV is a retransmission to the network, if the maximum retransmission attempt is larger than 0 and the first acknowledgment includes an "NACK". The UE may repeat the last four steps (i.e., Steps 414-420), until a second acknowledgment including an "ACK" is received from the network or the maximum retransmission attempt is achieved. That is, the UE transmits additional indicator(s) (i.e., the first NDI and/or the second NDI) to inform the network that the UL transmission (i.e., the first RV and/or the second RV) is the new transmission or the retransmission. Thus, the network can decode the UL transmission properly according to the additional indicator(s). As a result, throughput of decoding is improved and the benefit of the power saving of the UL transmission skipping mechanism is preserved.

It should be noted that Step 422 is performed by repeating Steps 414-420. That is, following Step 422, the UE may start from Step 414 again, until at least one of the conditions in Step 422 is satisfied.

Realization of the process 40 is not limited to the above description. The following examples may be applied for realizing the process 40.

In one example, the UE may skip another UL transmission after receiving a third UL grant configuring the UE to perform the other transmission, if the UE does not have UL data for transmitting.

In one example, the UE may receive a SPS configuration in a third resource (e.g., time/frequency resource) from the network according to (e.g., by using) a third MCS. The SPS configuration may be used for configuring (e.g., granting) indefinite opportunities (e.g., time/frequency resources) to the UE periodically (e.g., in a periodic fashion) to perform the UL transmission.

In on example, the ECC scheme may include at least one of a turbo coding scheme and a TBCC scheme. In one example, the ECC scheme may include at least one of a LDPC code scheme and a polar code scheme, and is not limited herein. In on example, the ECC scheme may be predetermined and specified (e.g., newly defined) in the 3GPP standard, e.g., explicitly. In on example, the ECC scheme may be already known by the network and the UE, e.g., implicitly. In one example, the ECC scheme may be configured (e.g., higher layer signaled) by the network, e.g., explicitly.

In on example, the first NDI and the second NDI may be absolute values (e.g., 1) indicating that the UL transmission (i.e., the first RV and/or the second RV) is the new transmission. In one example, the first NDI and the second NDI may be absolute values (e.g., 0) indicating that the UL transmission is the retransmission. In one example, the first NDI and the second NDI may be toggled values (i.e., a changed value changed from 0 to 1 or 1 to 0) indicating that the UL transmission is the new transmission. In one example, the first NDI and the second NDI may be toggled values (e.g., an unchanged value) indicating that the UL transmission is the retransmission.

In one example, a MCS, a mapping scheme and at least one resource used by the first NDI and/or the second NDI may be predetermined and specified (e.g., newly defined) in the 3GPP standard, e.g., explicitly. In one example, the MCS, the mapping scheme and the at least one resource used by the first NDI and/or the second NDI may be already known by the network and the UE, e.g., implicitly. In one example, the MCS, the mapping scheme and the at least one resource used by the first NDI and/or the second NDI may be configured (e.g., assigned) by the network, e.g., explicitly. In one example, the first NDI and/or the second NDI may be transmitted according to a puncturing scheme. That is, a plurality of parity bits of the transport block are overwritten for allocating the first NDI and/or the second NDI. In one example, the first NDI and/or the second NDI may be transmitted according to a rate matching scheme. That is, at least one resource unit (e.g., RB, near an UL RS) of the transport block which is not completely filled is used for allocating the first NDI and/or the second NDI. Examples of transmitting the first NDI and/or the second NDI are not limited herein.

In on example, the plurality of RV indices may be predetermined and specified (e.g., newly defined) in the 3GPP standard, e.g., explicitly. In on example, the ECC scheme may be already known by the network and the UE, e.g., implicitly. In on example, the plurality of RV indices may be determined according to at least one of a subframe index of a subframe used in the UL transmission and a C-RNTI of the UE, e.g., implicitly. In one example, the plurality of RV indices may be determined by the UE (e.g., autonomously), and may be transmitted to the network.

In one example, a MCS, a mapping scheme and at least one resource used by the plurality of RV indices may be predetermined and specified (e.g., newly defined) in the 3GPP standard, e.g., explicitly. In one example, the MCS, the mapping scheme and the at least one resource used by the plurality of RV indices may be already known by the network and the UE, e.g., implicitly. In one example, the MCS, the mapping scheme and the at least one resource used by the plurality of RV indices may be configured (e.g., assigned) by the network, e.g., explicitly. In one example, the plurality of RV indices may be transmitted according to a puncturing scheme. That is, a plurality of parity bits of the transport block are overwritten for allocating the plurality of RV indices. In one example, the plurality of RV indices may be transmitted according to a rate matching scheme. That is, at least one resource unit (e.g., RB, near an UL RS) of the transport block which is not completely filled is used for allocating the plurality of RV indices. Examples of transmitting the plurality of RV indices are not limited herein.

In on example, a HARQ process for the UL transmission may be disabled (e.g., not in use), if the maximum retransmission attempt is configured as 0. Thus, the UE may not perform any retransmission. In one example, the first RV and the second RV may be transmitted via a plurality of OFDM-based signals. Accordingly, the UL transmission may include a plurality of OFDM-based signals.

In one example, a size of the transport block may be determined by the UE according to at least one of the first MCS and the allocation of the first resource (e.g., RB). In one example, the UE may ignore the first RV and the first MCS in a first field of the first UL grant, because the first RV and the first MCS are already determined by the UE. In one example, the UE may ignore the second RV and the second MCS in a second field of the second UL grant, because the second RV and the second MCS are already determined by the UE.

Figure 5:
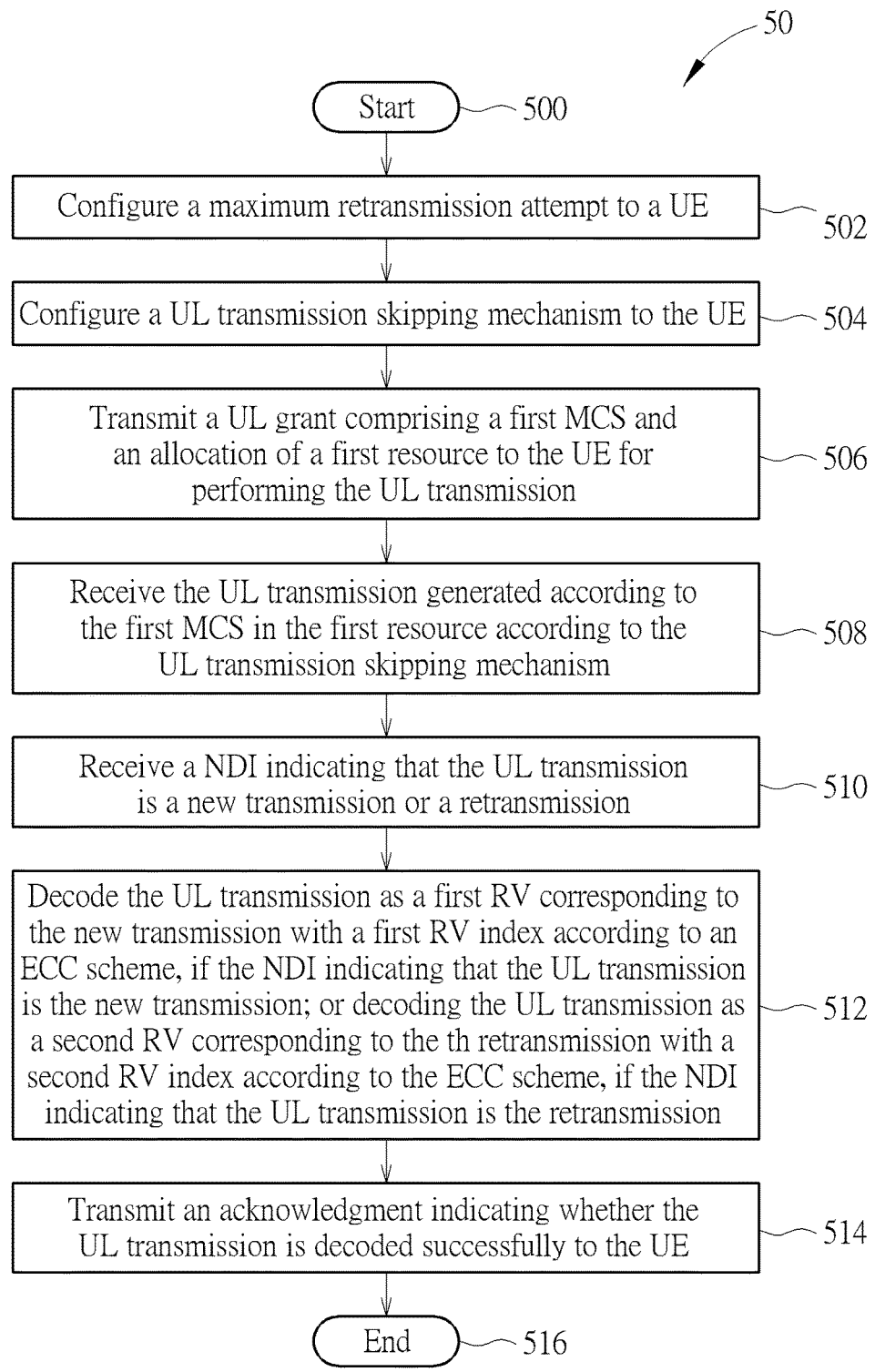
FIG. 5 is a flowchart of a process according to an example of the present invention.

FIG. 5 is a flowchart of a process 50 according to an example of the present invention. The process 50 may be utilized in a network, to handle UL transmission in a wireless communication system. The process 50 includes the following steps:

Step 500: Start.

Step 502: Configure a maximum retransmission attempt to a UE.

Step 504: Configure a UL transmission skipping mechanism to the UE.

Step 506: Transmit a UL grant comprising a first MCS and an allocation of a first resource to the UE for performing the UL transmission.

Step 508: Receive the UL transmission generated according to the first MCS in the first resource according to the UL transmission skipping mechanism.

Step 510: Receive a NDI indicating that the UL transmission is a new transmission or a retransmission.

Step 512: Decode the UL transmission as a first RV corresponding to the new transmission with a first RV index according to an ECC scheme, if the NDI indicating that the UL transmission is the new transmission; or decoding the UL transmission as a second RV corresponding to the mth retransmission with a second RV index according to the ECC scheme, if the NDI indicating that the UL transmission is the retransmission.

Step 514: Transmit an acknowledgment indicating whether the UL transmission is decoded successfully to the UE.

Step 516: End.

According to the process 50, the network may configure a maximum retransmission attempt and a UL transmission skipping mechanism to the UE. Then, the network may transmit a UL grant including a first MCS and an allocation of a first resource (e.g., RB) to the UE for performing the UL transmission (e.g., UL HARQ transmission). Further, the network may receive the UL transmission generated according to the first MCS in the first resource according to the UL transmission skipping mechanism, and may receive a NDI indicating that the UL transmission is a new transmission or a retransmission. The network may decode the UL transmission as a first RV corresponding to the new transmission with a first RV index (e.g., of a transport block) according to (e.g., by using) an ECC scheme, if the NDI indicating that the UL transmission is the new transmission; or may decode the UL transmission as a second RV corresponding to a mth retransmission with a second RV index (e.g., of the transport block) according to the ECC scheme, if the NDI indicating that the UL transmission is the retransmission. The network may transmit an acknowledgment (e.g., "ACK" or "NACK") indicating whether the UL transmission is decoded successfully to the UE. That is, the network receives an additional indicator (i.e., the NDI) informing that the UL transmission is the new transmission or the retransmission from the UE. Thus, the network can decode the UL transmission properly according to the additional indicator. As a result, throughput of decoding is improved and the benefit of the power saving of the UL transmission skipping mechanism is preserved.

Realization of the process 50 is not limited to the above description. The following examples may be applied for realizing the process 50.

In on example, the maximum retransmission attempt may be a positive integer. In on example, m may be smaller than (or equal to) the maximum retransmission attempt. In on example, m may be determined according to the number of at least one (e.g., consecutively) received NDI indicating that the UL transmission is the retransmission.

In on example, the network may transmit a SPS configuration in a second resource (e.g., time/frequency resource) to the UE according to (e.g., by using) a second MCS. The SPS configuration may be used for configuring (e.g., granting) indefinite opportunities (e.g., time/frequency resources) to the UE periodically (e.g., in a periodic fashion) to perform the UL transmission.

In on example, the ECC scheme may include at least one of a turbo coding scheme and a TBCC scheme. In one example, the ECC scheme may include at least one of a LDPC code scheme and a polar code scheme, and is not limited herein. In on example, the ECC scheme may be predetermined and specified (e.g., newly defined) in the 3GPP standard, e.g., explicitly. In on example, the ECC scheme may be already known by the network and the UE, e.g., implicitly. In one example, the ECC scheme may be configured (e.g., higher layer signaled) by the network, e.g., explicitly.

In on example, the NDI may be an absolute value (e.g., 1) indicating that the UL transmission is the new transmission. In on example, the NDI may be an absolute value (e.g., 0) indicating that the UL transmission is the retransmission. In one example, the NDI may be a toggled value (e.g., a changed value changed from 0 to 1 or 1 to 0) indicating that the UL transmission is the new transmission. In one example, the NDI may be a toggled value (e.g., an unchanged value) indicating that the UL transmission is the retransmission.

In one example, the UL transmission may be transmitted according to (e.g., by using) the first MCS and the first allocation of the first resource, and the NDI may be transmitted according to (e.g., by using) a third MCS, a mapping scheme and a third resource. In other words, the NDI and the UL transmission may be encoded, modulated and mapped to different resources (e.g., time/frequency resources) separately by the UE. Accordingly, the NDI and the UL transmission may be received separately. That is, the NDI is received separately from the UL transmission. In one example, the third MCS, the mapping scheme and the third resource used by the NDI may be predetermined and specified (e.g., newly defined) in the 3GPP standard, e.g., explicitly. In one example, the third MCS, the mapping scheme and the third resource used by the NDI may be already known by the network and the UE, e.g., implicitly. In one example, the third MCS, the mapping scheme and the third resource used by the NDI may be configured (e.g., assigned) by the network, e.g., explicitly. In one example, the NDI may be transmitted according to a puncturing scheme. That is, a plurality of parity bits of the transport block are overwritten for allocating the NDI. In one example, the NDI may be transmitted according to a rate matching scheme. That is, at least one resource unit (e.g., RB, near an UL RS) of the transport block which is not completely filled is used for allocating the NDI. Examples of transmitting the NDI are not limited herein.

In on example, the network may skip decoding the UL transmission, if m is larger than the maximum retransmission attempt. In on example, the network may skip transmitting the acknowledgment, if m is larger than the maximum retransmission attempt.

In on example, the first RV index and the second RV index may be predetermined and specified (e.g., newly defined) in the 3GPP standard, e.g., explicitly. In on example, the first RV index and the second RV index may be already known by the network and the UE, e.g., implicitly. In on example, the first RV index and the second RV index may be determined according to at least one of a subframe index of a subframe used in the UL transmission and a C-RNTI of the UE, e.g., implicitly. In on example, the network may receive the first RV index and the second RV index determined by the UE (e.g., autonomously) from the UE.

In on example, the first RV index (and/or the second RV index) and the UL transmission may be encoded, modulated and mapped to different resources (e.g., time/frequency resources) separately by the UE. Accordingly, the first RV index (and/or the second RV index) and the UL transmission may be received separately. That is, the first RV index (and/or the second RV index) is received separately from the UL transmission. In one example, a MCS, a mapping scheme and a resource used by the first RV index (and/or the second RV index) may be predetermined and specified (e.g., newly defined) in the 3GPP standard, e.g., explicitly. In one example, the fourth MCS, the second mapping scheme and the fourth resource used by the first RV index (and/or the second RV index) may be already known by the network and the UE, e.g., implicitly. In one example, the fourth MCS, the second mapping scheme and the fourth resource used by the first RV index (and/or the second RV index) may be configured (e.g., assigned) by the network, e.g., explicitly. In one example, the first RV index (and/or the second RV index) may be transmitted according to a puncturing scheme. That is, a plurality of parity bits of the transport block are overwritten for allocating the first RV index (and/or the second RV index). In one example, the first RV index (and/or the second RV index) may be transmitted according to a rate matching scheme. That is, at least one resource block (e.g., near an UL reference signal (RS)) of the transport block (and/or the second RV) which is not completely filled is used for allocating the first RV index (and/or the second RV index). Examples of transmitting the first RV index (and/or the second RV index) are not limited herein.

In on example, a HARQ process for the UL transmission may be disabled (e.g., not in use), if the maximum retransmission attempt is configured as 0. Thus, the network may not receive any retransmission from the UE. In on example, the UL transmission includes a plurality of OFDM-based signals. Accordingly, the UL transmission may be received as the OFDM-based signals.

An example is illustrated as follows according to the processes 40 and 50. A network configures a maximum retransmission attempt as 1, and configures a UL transmission skipping mechanism to a UE. Then, the network assigns a first resource (e.g., time/frequency resource) to the UE, and transmits a first UL grant to the UE. The UE receives the first UL grant. Then, the UE encodes a UL data by using a turbo coding scheme, and prepares 2 RVs, e.g., RV0 and RV1 for the UL data. The UE transmits the RV0 and a first NDI indicating a new transmission via (e.g., at) the first resource. The network receives the RV0 and the first NDI via the first resource. The network transmits an "ACK" to the UE if the RV0 is decoded successfully, and transmits a "NACK" to the UE if the RV0 is decoded unsuccessfully. It is assumed that the RV0 is decoded unsuccessfully, and, the "NACK" is transmitted to the UE. The network assigns a second resource (e.g., time/frequency resource) to the UE, and transmits a second UL grant to the UE. The UE receives the second UL grant. The UE transmits the RV1 and a second NDI indicating a retransmission to the network via (e.g., at) the second resource. The network performs a joint decoding by soft combining the RV1 with previously received RV (i.e., the RV0). The network transmits an "ACK" to the UE if the RV1 is decoded successfully, and transmits a "NACK" to the UE if the RV1 is decoded unsuccessfully. It is assumed that the RV1 is decoded successfully, and the "ACK" is transmitted to the UE.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling the UL transmission performed with the UL transmission skipping mechanism. Thus, the network can decode the UL transmission properly according to the blind decoding scheme or the additional indicator(s). As a result, throughput of decoding can be improved and the benefit of the power saving of the UL transmission skipping mechanism can be preserved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network of handling uplink (UL) transmission, comprising:
   a storage unit, for storing instructions of:
   configuring a maximum retransmission attempt to a communication device;
   configuring a UL transmission skipping mechanism to the communication device;
   transmitting a UL grant comprising a first modulation and coding scheme (MCS) and an allocation of a first resource to the communication device for performing the UL transmission;
   receiving the UL transmission generated according to the first MCS in the first resource according to the UL transmission skipping mechanism;
   decoding the UL transmission for a plurality of times according to an error control coding (ECC) scheme, wherein the UL transmission is a first redundant version (RV) corresponding to a new transmission with a first RV index or a second RV corresponding to a retransmission with a second RV index; and
   transmitting an acknowledgment indicating whether the UL transmission is decoded successfully to the communication device; and
   a processing circuit, coupled to the storage unit, configured to execute the instructions stored in the storage unit.

2. The network of claim 1, wherein the maximum retransmission attempt, N, is a positive integer, the plurality of times, K, is a positive integer smaller than (N+1), and the retransmission is the nth retransmission, wherein n is a positive integer smaller than N.

3. The network of claim 1, wherein the storage unit further stores the instruction of:

transmitting a preconfigured semi-persistent scheduling (SPS) configuration in a second resource to the communication device according to a second MCS.

4. The network of claim 1, wherein the ECC scheme comprises at least one of a turbo coding scheme and a tail-biting convolutional coding scheme.

5. The network of claim 1, wherein the network receives the first RV index and the second RV index determined by the communication device from the communication device.

6. The network of claim 1, wherein the storage unit further stores the instruction of:
storing the UL transmission in a soft buffer.

7. A communication device of handling uplink (UL) transmission, comprising:
a storage unit, for storing instructions of:
receiving a first configuration configuring a maximum retransmission attempt from a network;
receiving a second configuration configuring a UL transmission skipping mechanism from the network;
receiving a first UL grant comprising a first modulation and coding scheme (MCS) and an allocation of a first resource from the network;
encoding a transport block according to an error control coding (ECC) scheme;
transmitting a first redundant version (RV) of the transport block according to a plurality of RV indices, the first MCS, the allocation of the first resource and the UL transmission skipping mechanism to the network;
transmitting a first new data indicator (NDI) indicating that the first RV is a new transmission to the network;
receiving a first acknowledgment indicating whether the first RV is decoded successfully from the network;
receiving a second UL grant comprising a second MCS and an allocation of a second resource from the network;
transmitting a second RV of the transport block according to the plurality of RV indices, the second MCS, the allocation of second resource and the UL transmission skipping mechanism to the network;
transmitting a second NDI indicating that the second RV is a retransmission to the network, if the maximum retransmission attempt is larger than 0 and the first acknowledgment comprises an "NACK"; and
repeating the last four instructions, until a second acknowledgment comprising an "ACK" is received from the network or the maximum retransmission attempt is achieved; and
a processing circuit, coupled to the storage unit, configured to execute the instructions stored in the storage unit.

8. The communication device of claim 7, wherein the storage unit further stores the instruction of:
skipping another UL transmission after receiving a third UL grant configuring the communication device to perform the other transmission, if the communication device does not have UL data for transmitting.

9. The communication device of claim 7, wherein the storage unit further stores the instruction of:
receiving a preconfigured semi-persistent scheduling (SPS) configuration in a third resource from the network according to a third MCS.

10. The communication device of claim 7, wherein the ECC scheme comprises at least one of a turbo coding scheme and a tail-biting convolutional coding scheme.

11. The communication device of claim 7, wherein a fourth MCS and an allocation of a fourth resource for transmitting the first NDI, and a fifth MCS and an allocation of a fifth resource for transmitting the second NDI are configured by the network.

12. The communication device of claim 7, wherein the plurality of RV indices are determined by the communication device.

13. The communication device of claim 7, wherein a sixth MCS and an allocation of a sixth resource for transmitting the plurality of RV indices are configured by the network.

14. The communication device of claim 7, wherein the storage unit further stores the instructions of:
ignoring the first RV and the first MCS in a first field of the first UL grant; and
ignoring the second RV and the second MCS in a second field of the second UL grant.

15. A network of handling uplink (UL) transmission, comprising:
a storage unit, for storing instructions of:
configuring a maximum retransmission attempt to a communication device;
configuring a UL transmission skipping mechanism to the communication device;
transmitting a UL grant comprising a first modulation and coding scheme (MCS) and an allocation of a first resource to the communication device for performing the UL transmission;
receiving the UL transmission generated according to the first MCS in the first resource according to the UL transmission skipping mechanism;
receiving a new data indicator (NDI) indicating that the UL transmission is a new transmission or a retransmission;
decoding the UL transmission as a first redundant version (RV) corresponding to the new transmission with a first RV index according to an error control coding (ECC) scheme, if the NDI indicating that the UL transmission is the new transmission; or decoding the UL transmission as a second RV corresponding to a mth retransmission with a second RV index according to the ECC scheme, if the NDI indicating that the UL transmission is the retransmission, wherein m is a positive integer; and
transmitting an acknowledgment indicating whether the UL transmission is decoded successfully to the communication device; and
a processing circuit, coupled to the storage unit, configured to execute the instructions stored in the storage unit.

16. The network of claim 15, wherein the maximum retransmission attempt is a positive integer, and m is smaller than the maximum retransmission attempt and is determined according to the number of at least one received NDI indicating that the UL transmission is the retransmission.

17. The network of claim 15, further comprising:
transmitting a preconfigured semi-persistent scheduling (SPS) configuration in a second resource to the communication device according to a second MCS.

18. The network of claim 15, wherein the NDI and the UL transmission are received separately.

19. The network of claim 15, wherein the storage unit further stores the instructions of:
skipping decoding the UL transmission, if m is larger than the maximum retransmission attempt; and
skipping transmitting the acknowledgment, if m is larger than the maximum retransmission attempt.

* * * * *